(12) United States Patent
Sue et al.

(10) Patent No.: US 11,815,733 B2
(45) Date of Patent: Nov. 14, 2023

(54) OPTICAL UNIT

(71) Applicant: NIDEC SANKYO CORPORATION, Nagano (JP)

(72) Inventors: Takeshi Sue, Nagano (JP); Masato Gomyo, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 392 days.

(21) Appl. No.: 17/264,853

(22) PCT Filed: Jul. 5, 2019

(86) PCT No.: PCT/JP2019/026757
§ 371 (c)(1),
(2) Date: Feb. 1, 2021

(87) PCT Pub. No.: WO2020/031578
PCT Pub. Date: Feb. 13, 2020

(65) Prior Publication Data
US 2021/0215900 A1      Jul. 15, 2021

(30) Foreign Application Priority Data
Aug. 6, 2018    (JP) .................................. 2018-147752

(51) Int. Cl.
*G02B 7/02*      (2021.01)
*G02B 27/64*     (2006.01)
(Continued)

(52) U.S. Cl.
CPC ........... *G02B 7/028* (2013.01); *G02B 27/646* (2013.01); *G03B 5/06* (2013.01); *G03B 17/55* (2013.01);
(Continued)

(58) Field of Classification Search
None
See application file for complete search history.

(56) References Cited

U.S. PATENT DOCUMENTS

| 7,933,515 B2 | 4/2011 | Iyoda et al. |
| 8,913,178 B2 | 12/2014 | Lee et al. |

(Continued)

FOREIGN PATENT DOCUMENTS

| CN | 103048854 | 4/2013 |
| CN | 104204889 | 12/2014 |

(Continued)

OTHER PUBLICATIONS

"International Search Report (Form PCT/ISA/210)" of PCT/JP2019/026757, dated Sep. 10, 2019, with English translation thereof, pp. 1-4.

(Continued)

*Primary Examiner* — Derek S. Chapel
(74) *Attorney, Agent, or Firm* — JCIPRNET

(57) ABSTRACT

An optical unit is provided for performing heat dissipation for an optical module. The optical unit includes a movable body having the optical module and a fixed body which holds the movable body in a displaceable state. The movable body includes a circuit board provided in the optical module and at least one heat radiation member disposed in a periphery of the optical module. The heat radiation member is connected with the circuit board in a heat-conductive manner.

5 Claims, 11 Drawing Sheets

(51) Int. Cl.
*G03B 5/06* (2021.01)
*G03B 17/55* (2021.01)

(52) U.S. Cl.
CPC ............... *G03B 2205/0023* (2013.01); *G03B 2205/0069* (2013.01)

(56) References Cited

U.S. PATENT DOCUMENTS

| | | |
|---|---|---|
| 9,179,053 B2 | 11/2015 | Takeshita et al. |
| 9,253,387 B2 | 2/2016 | Furusawa et al. |
| 9,933,629 B2 | 4/2018 | Minamisawa |
| 2011/0103784 A1 | 5/2011 | Hashizume et al. |
| 2013/0093947 A1 | 4/2013 | Lee et al. |
| 2013/0093948 A1* | 4/2013 | Takeshita ............... H04N 23/54 348/374 |
| 2014/0168507 A1 | 6/2014 | Renaud |
| 2017/0010475 A1* | 1/2017 | Minamisawa ......... H02K 33/18 |

FOREIGN PATENT DOCUMENTS

| | | |
|---|---|---|
| CN | 107515506 | 12/2017 |
| JP | 2007134811 | 5/2007 |
| JP | 2007148023 | 6/2007 |
| JP | 2010092038 | 4/2010 |
| JP | 2014006522 | 1/2014 |
| JP | 2018077390 | 5/2018 |
| WO | 2012137267 | 10/2012 |

OTHER PUBLICATIONS

Office Action of China Counterpart Application, with English translation thereof, dated Jan. 11, 2022, pp. 1-10.
Office Action of China Counterpart Application, with English translation thereof, dated Aug. 17, 2021, pp. 1-14.

* cited by examiner

OPTICAL UNIT

CROSS-REFERENCE TO RELATED APPLICATION

This application is a 371 application of the international PCT application serial no. PCT/JP2019/026757, filed on Jul. 5, 2019, which claims the priority benefits of Japan application no. 2018-147752 filed on Aug. 6, 2018. The entirety of each of the above—mentioned patent applications is hereby incorporated by reference herein and made a part of this specification.

TECHNICAL FIELD

The present invention relates to an optical unit in which heat radiation of an optical module is taken into consideration.

BACKGROUND ART

As an example of an optical unit, an optical unit is disclosed in Patent Literature 1. The optical unit is provided with functions performing corrections of pitching (vertical swing) and yawing (lateral swing).

Specifically, an optical unit 100 is provided with a gimbal mechanism 30 by utilizing corners of an optical module 10 and corners of a rectangular tube-shaped body part 210 of a fixed body 20. In other words, a structure is adopted in which a rectangular movable frame 32 is disposed between a second rectangular frame 42 of the optical module 10 and a rectangular frame 25 fixed to a rectangular tube-shaped body part 210, and a first corner part 321 of the movable frame 32 and its third corner part 323 facing the first corner part 321 are swingably supported by two corresponding corner parts of the rectangular frame 25, and a second corner part 322 of the movable frame 32 and its fourth corner part 324 facing the second corner part 322 swingably support two remaining corresponding corner parts of the second frame 42.

CITATION LIST

Patent Literature

[Patent Literature 1] Japanese Patent Laid-Open No. 2014-6522

SUMMARY OF THE INVENTION

Problems to be Solved by the Invention

In recent years, an image display device (display) such as 4K television or 8K television which projects high-definition image has been spreading rapidly. As a result, also in an optical module provided in an optical unit, for example, in a camera module or the like, a pixel number and density of a sensor are required to increase for coping with the high-definition image.

However, when an increase of a pixel number and a high density of a sensor are attained in a camera module, heat generation amount in the camera module is increased. As a result, in a camera module, for example, a circuit board provided with an imaging element may be deformed by heat generation and thereby a focal length to an object to be photographed is deviated and correct imaging becomes difficult.

In view of the problem described above, the present invention provides an optical unit in which heat radiation in an optical module is taken into consideration.

Means to Solve the Problems

To solve the above-mentioned problem, the present invention provides an optical unit including a movable body having an optical module and a fixed body which holds the movable body in a displaceable state. The movable body includes a circuit board provided in the optical module and at least one heat radiation member disposed in a periphery of the optical module, and the heat radiation member is connected with the circuit board in a heat-conductive manner.

In the optical unit in this embodiment, a heat radiation member is connected with a circuit board in a heat-conductive manner. Therefore, heat generated in the optical module is conducted to the heat radiation member through the circuit board. As a result, heat generated in the optical module is radiated by the heat radiation member and thus, the optical module can be maintained in an appropriate temperature condition and performance of the optical module can be maintained.

In the optical unit in accordance with the present invention, the heat radiation member is formed of metal material, and the heat radiation member is connected with a metal foil formed on the circuit board by a solder.

According to this embodiment, the heat radiation member formed of metal material is connected with a metal foil formed on the circuit board by a solder, and thus, heat is surely conducted from the circuit board to the heat radiation member. In addition, the heat radiation member is made of metal material and thus, the heat conductivity can be improved and heat of the optical module can be efficiently radiated.

In the optical unit in accordance with the present invention, the optical unit includes a shake correction drive mechanism structured to drive the movable body around a first axial line intersecting an optical axis direction of the optical module and around a second axial line intersecting the optical axis direction and the first axial line, and the shake correction drive mechanism is structured of a magnet provided on a side of the movable body and a coil provided on a side of the fixed body, and the heat radiation member is structured of a magnetic body, and the heat radiation member is disposed between the optical module and the magnet in a direction intersecting the optical axis direction.

Some of the optical modules are provided with magnetic circuits structured to perform corrections of pitching (vertical swing) and yawing (lateral swing). In the optical module including these magnetic circuits, in a case that a housing of the optical module is structured of a nonmagnetic body, magnetism of the magnetic circuit may leak out from the optical module and interfere with the shake correction drive mechanism in the optical unit in accordance with the present invention.

According to this embodiment, the heat radiation member is structured of a magnetic body and the heat radiation member is disposed between the optical module and the magnet in a direction intersecting the optical axis. Therefore, in a case that a housing of the optical module is a nonmagnetic body, the heat radiation member which is a magnetic body functions as a back yoke and interference between the magnetic circuit and the shake correction drive mechanism can be restrained. Accordingly, malfunction or the like in the shake correction drive mechanism can be suppressed.

In the optical unit in accordance with the present invention, the heat radiation member is structured of a frame-shaped member which surrounds the optical module around an optical axis of the optical module.

The phrase of that "frame-shaped member which surrounds the optical module" in the present specification means to include an embodiment surrounding the optical module with a single member and, in addition, include an embodiment in which a plurality of heat radiation members is connected with each other to surround the optical module and, furthermore include an embodiment in which the frame-shaped member has a constant height in the optical axis direction, or an embodiment in which the frame-shaped member is appropriately provided with a protruded and recessed part at least in one of the optical axis direction and a direction intersecting the optical axis.

According to this embodiment, the heat radiation member is structured of a frame-shaped member which surrounds the optical module around an optical axis of the optical module and thus, a surface area of the heat radiation member can be increased and heat radiation can be improved.

In the optical unit in accordance with the present invention, the heat radiation member is disposed around an optical axis of the optical module at intervals and faces the magnet.

In this embodiment, the heat radiation member is disposed around the optical axis of the optical module at intervals so as to face the magnet and thus, heat radiation in the optical module is performed and, in addition, interference between the shake correction drive mechanism and the magnetic circuit is restrained, and a weight of the optical unit can be reduced.

In the optical unit in accordance with the present invention, the circuit board is disposed on an opposite side to an object side of the optical module, and the circuit board is provided with a protruded part which is protruded with respect to the optical module in a direction intersecting an optical axis of the optical module, and at least a part of the heat radiation member is disposed on the protruded part.

According to this embodiment, at least a part of the heat radiation member is disposed on the protruded part which is protruded from the optical module in a direction intersecting the optical axis of the optical module and thus, the heat radiation member can be disposed within an area occupied by the circuit board in the direction intersecting the optical axis and a size of the optical module in the direction intersecting the optical axis can be reduced.

In the optical unit in accordance with the present invention, at least a part of the heat radiation member is overlapped with the optical module in an optical axis direction of the optical module.

According to this embodiment, at least a part of the heat radiation member is overlapped with the optical module in the optical axis direction of the optical module and thus, a size of the optical module in the optical axis direction can be reduced.

Effects of the Invention

According to the present invention, a heat radiation member is connected with a circuit board in a heat-conductive manner. Therefore, heat generated in the optical module is conducted to the heat radiation member through the circuit board. As a result, heat generated in the optical module is radiated by the heat radiation member and thus, the optical module can be maintained in an appropriate temperature condition and performance of the optical module can be maintained.

DESCRIPTION OF EMBODIMENTS

Figure 1:
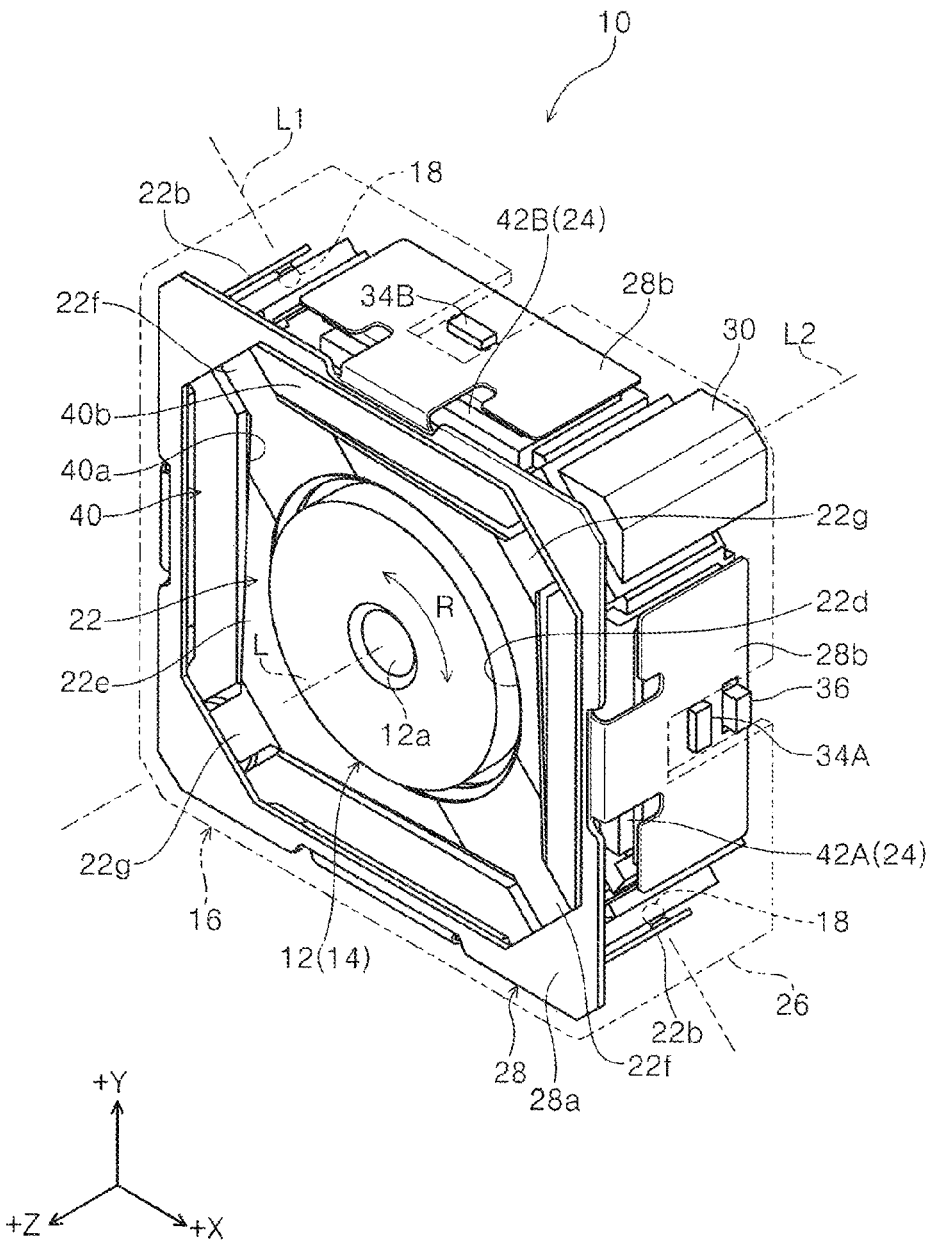
FIG. 1 is a perspective view showing an optical unit in accordance with the present invention in which an outer casing is indicated in a transparent manner.

Embodiments of the present invention will be described below with reference to the accompanying drawings. The same reference signs are used in the same structures in each of the respective embodiments, and the respective structures are described only in the first embodiment and their descriptions will be omitted in the following embodiments.

First Embodiment

Schematic Entire Structure of Optical Unit

A structure of an optical unit 10 in accordance with a first embodiment will be described below with reference to FIG. 1 through FIG. 4. The optical unit 10 includes a movable body 14 having an optical module 12, a fixed body 16 which holds the movable body 14 in a displaceable state at least in a pitching (vertical swing) direction "Y" and in a yawing (lateral swing) direction "X", a gimbal mechanism 22 provided with a first support part 18, which swingably supports the movable body 14 around a first axial line "L1" intersecting an optical axis direction "Z" of the optical module 12, and a second support part 20 which is swingably supported by a member on the fixed body 16 side around a second axial line "L2" intersecting the optical axis direction "Z" and the first axial line "L1" direction, and a shake correction drive mechanism 24 structured to drive the movable body 14 around the first axial line "L1" and around the second axial line "L2".

The optical unit 10 in this embodiment is an optical unit which is provided with correction functions of pitching (vertical swing), yawing (lateral swing) and rolling (swing around the optical axis "L") of the optical module 12. The optical module 12 is used as a thin camera or the like which is, for example, mounted on a portable telephone with a camera or a tablet type PC. An actuator portion which holds the optical module 12 and performs corrections of swings in the pitching direction "Y", the yawing direction "X" and the rolling direction "R" which are occurred in the optical module 12 is a main structure of the optical unit 10. Next, a specific structure of the optical unit 10 will be described in detail below.

Regarding Fixed Body

Figure 2:
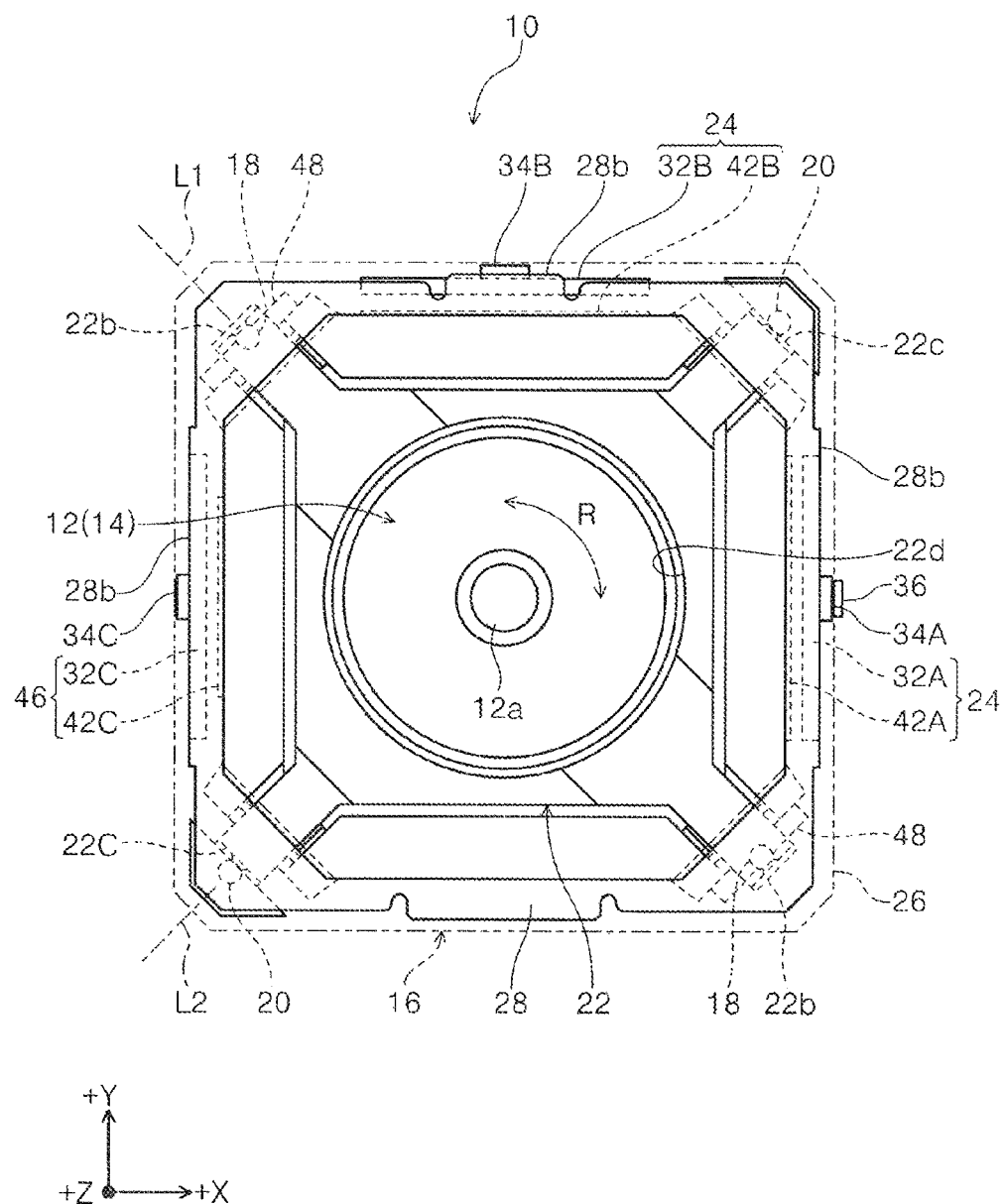
FIG. 2 is a plan view showing an optical unit in accordance with the present invention in which an outer casing is indicated in a transparent manner.
Figure 3:
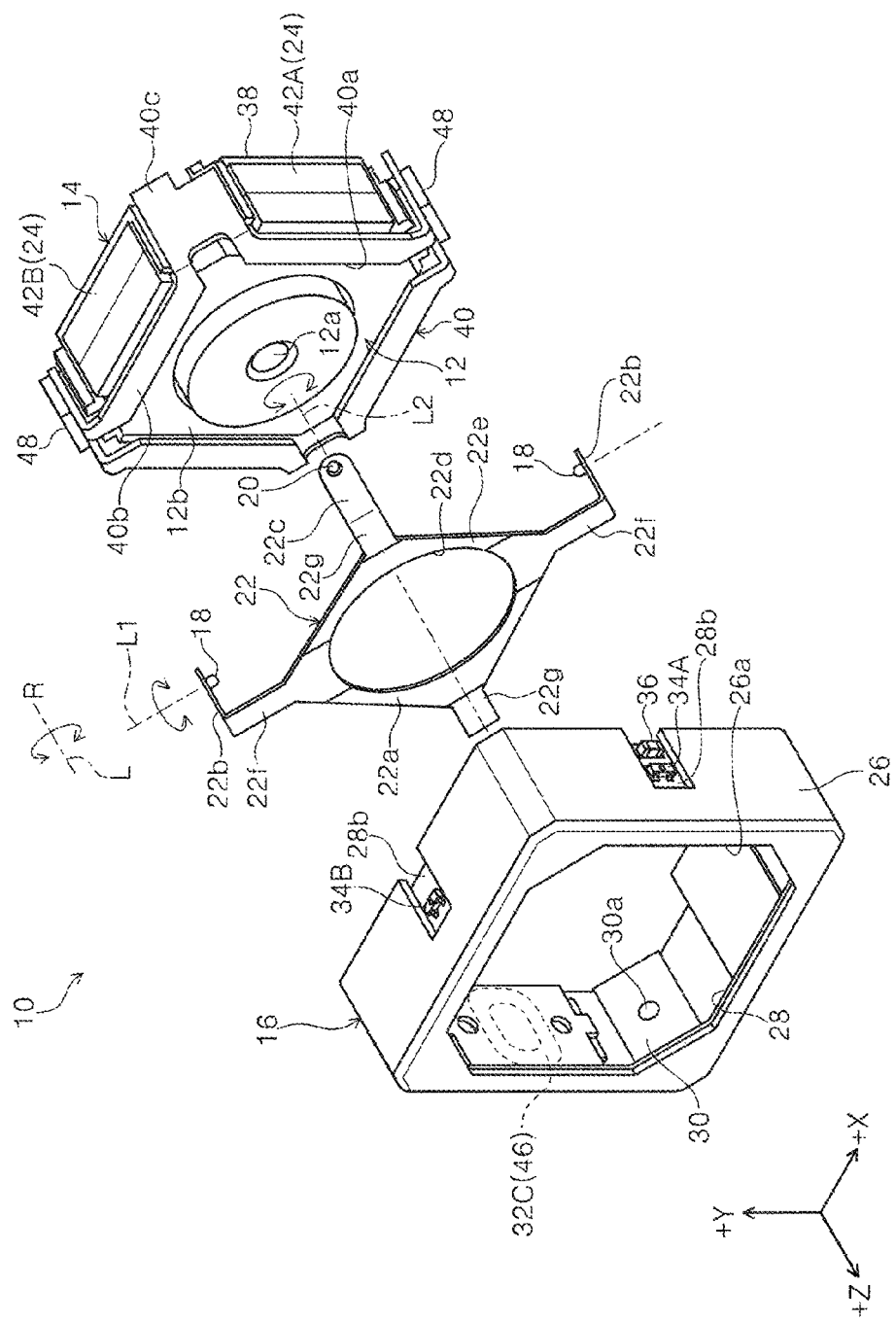
FIG. 3 is an exploded perspective view showing an optical unit in accordance with the present invention.

As shown in FIG. 3, the movable body 14 is attached to the fixed body 16 through the gimbal mechanism 22. In this embodiment, the fixed body 16 includes, as shown in FIG. 1 through FIG. 3, as an example, an outer casing 26, a coil attaching frame 28 assembled in an inside of the outer casing 26, and second bearing members 30 which are attached to inner faces of corner parts in the second axial line "L2" direction of the outer casing 26.

The outer casing 26 is structured so that it is provided with a window part 26a in a front face on the object side "+Z" and its rear face on an opposite side "–Z" to an object to be photographed is opened, and the outer casing 26 is structured as a rectangular container-shaped member which is a little larger than the optical module 12.

The coil attaching frame 28 is structured so that, as shown in FIG. 1 and FIG. 3, the coil attaching frame 28 is provided on the object side "+Z" with a flat plate part 28a in a rectangular frame shape whose center part is opened and is formed with three coil attaching plates 28b which are bent along the optical axis direction "Z" from three sides of the flat plate part 28a by 90° to an opposite side "–Z" to an object to be photographed.

Inner faces of the three coil attaching plates 28b are attached with two coils 32A and 32B (FIG. 2) for pitching correction and yawing correction and one coil 32C for rolling correction (FIG. 2 and FIG. 3). In this embodiment, as the coils 32A, 32B and 32C, a pattern substrate (coil substrate) is adopted in which a coil is incorporated into wiring in a substrate as a pattern. In accordance with an embodiment of the present invention, as the coils 32A, 32B and 32C, a winding coil may be used instead of such a pattern substrate.

Three magnetic sensors (Hall element) 34A, 34B and 34C (FIG. 1 through FIG. 3) for detecting variation of magnetic flux density are provided in the vicinity of the three coils 32A, 32B and 32C, specifically, on outer faces of three coil attaching plates 28b. Near the magnetic sensor 34A provided in the vicinity of the coil 32A, a thermistor 36 is provided which detects temperature change of the coil 32A for utilizing in respective corrections of detection values of the three magnetic sensors 34A, 34B and 34C based on the detected temperature change.

The second bearing member 30 is a block-shaped member which is long in the optical axis direction "Z" and has a trapezoid cross section, and its inner face is formed with a recessed part 30a (FIG. 3) which receives and engages with the second support part 20.

Regarding Gimbal Mechanism

Figure 4:
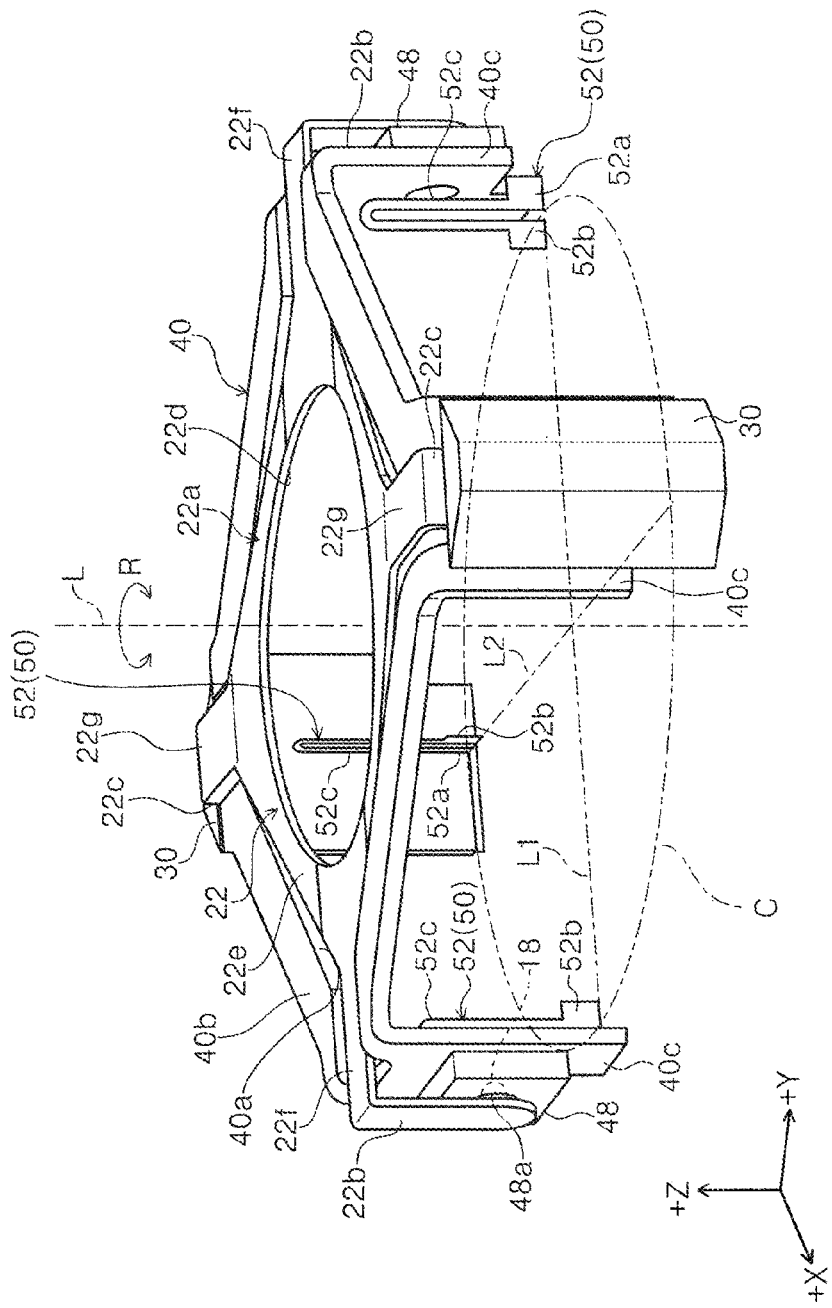
FIG. 4 is a perspective view showing a gimbal mechanism, an intermediate frame body, a first bearing part, a second bearing part and an elastic member of an optical unit.

In FIG. 3 and FIG. 4, the gimbal mechanism 22 is provided with a gimbal frame part 22a, which is disposed on one side of the object side "+Z" of the optical module 12 and an opposite side "–Z" to an object to be photographed, first support part extended parts 22b which are extended in the optical axis direction "Z" from the gimbal frame part 22a and are provided with first support parts 18, and second support part extended parts 22c which are extended in the optical axis direction "Z" from the gimbal frame part 22a and are provided with second support parts 20.

The gimbal frame part 22a is, as an example, disposed on the object side "+Z" with respect to the optical module 12. An opening part 22d is formed in a center part of the gimbal frame part 22a located on a light incident part side of the optical module 12.

The gimbal frame part 22a is formed in an "X"-shape which is provided with a base frame 22e in a rectangular frame shape whose center is formed with the circular opening part 22d, first extended parts 22f which are extended in the first axial line "L1" direction and second extended parts 22g which are extended in the second axial line "L2" direction from four corner parts of the base frame 22e with the optical axis "L" as a center.

The gimbal mechanism 22 in this embodiment is, as an example, formed of a metal plate, and the first extended part 22f and the second extended part 22g of the gimbal frame part 22a in an "X"-shape are formed long in the extended directions, and the first support part extended part 22b and the second support part extended part 22c are formed by bending these tip end parts.

The first support part 18 is provided on an inner side face of the first support part extended part 22b which faces the movable body 14. The first support part 18 is structured of a metal member which is formed in a protruded curved face. The first support part 18 is, as an example, formed with a protruded part by pressing or the like in the first support part extended part 22b. Alternatively, the first support part 18 is attached by directly welding to the first support part extended part 22b.

The second support part 20 is provided on an outer face of the second support part extended part 22c which faces the fixed body 16. The second support part 20 is structured of a metal member which is formed in a protruded curved face. The second support part 20 is, as an example, formed with a protruded part by pressing or the like in the second support part extended part 22c. Alternatively, the second support part 20 is attached by directly welding to the second support part extended part 22c.

Regarding Movable Body

In this embodiment, the movable body 14 includes the optical module 12, a holder frame 38 and an intermediate frame body 40. The optical module 12 is provided with a lens 12a on the object side "+Z" and incorporates an optical device for imaging and the like in an inside of a rectangular case-shaped housing 12b. The holder frame 38 is structured as a rectangular frame-shaped member (FIG. 6) which is provided so as to surround remaining four faces except a front face where the lens 12a of the optical module 12 is provided and a rear face on the opposite side. The two magnets 42A and 42B for detection and correction of pitching and yawing and the magnet 42C for detection and correction of rolling are attached to outer face sides of the holder frame 38 by utilizing three faces of the holder frame 38.

In this embodiment, a pair of the coil 32A and the magnet 42A and a pair of the coil 32B and the magnet 42B structure the shake correction drive mechanism 24 for correcting a posture of the movable body 14. Pitching and yawing of the movable body 14 are corrected by the shake correction drive mechanism 24.

In this embodiment, a pair of the coil 32C and the magnet 42C structures a rolling drive mechanism 46. Correction of rolling of the movable body 14 is performed by the rolling drive mechanism 46.

The intermediate frame body 40 is structured as a member formed by bending a metal flat plate which is provided so as to surround the holder frame 38 from the object side "+Z" (FIG. 3). The intermediate frame body 40 in this embodiment is provided with a flat plate part 40b in a rectangular frame shape having an opening part 40a in a center part which is largely opened in a rectangular shape on the object side "+Z". The intermediate frame body 40 has a structure provided with four side plate parts 40c along the optical axis direction "Z" which are bent by 90° to the opposite side "−Z" to an object to be photographed in the corner parts of the flat plate part 40b.

In this embodiment, outer faces of the side plate parts 40c located in the first axial line "L1" direction of the four side plate parts 40c are, as an example, attached with first bearing members 48 in a rectangular flat plate shape. An outer face of the first bearing member 48 is formed with a recessed part 48a (FIG. 4) which receives and engages with the first support part 18.

In this embodiment, in the gimbal mechanism 22, the first support parts 18 in a protruding curved face shape are contacted with the recessed parts 48a of the first bearing members 48 of the intermediate frame body 40 of the movable body 14 and support the movable body 14. On the other hand, in the gimbal mechanism 22, the second support parts 20 in a protruding curved face shape are contacted with the recessed parts 30a of the second bearing members 30 of the fixed body 16 and are supported by the fixed body 16. Therefore, in this embodiment, the gimbal mechanism 22 is capable of turning around the second axial line "L2" with respect to the fixed body 16, and the movable body 14 is capable of turning around the first axial line "L1" with respect to the gimbal mechanism 22, as a result, with respect to the fixed body 16.

Regarding Rolling Drive Mechanism and Rolling Support Mechanism

In this embodiment, the optical unit 10 includes a rolling support mechanism 50 (FIG. 4) which turnably supports the movable body 14 with respect to the fixed body 16 around the optical axis "L" of the optical module 12, and a rolling drive mechanism 46 (FIG. 2) structured to turn the movable body 14 around the optical axis "L". In this embodiment, the rolling support mechanism 50 is structured so that elastic members 52 (FIG. 4) are provided which are disposed between the movable body 14 and the fixed body 16 in the directions "X" and "Y" intersecting the optical axis "L" at a plurality of positions on the circumference "C" (FIG. 4) having a predetermined radius around the optical axis "L", and that the elastic members 52 turnably support the movable body 14 around the optical axis "L".

The elastic member 52 is structured of a plate spring 52 (the same reference sign as the elastic member is used) which is capable of being resiliently bent and deformed around the optical axis "L". In this embodiment, the intermediate frame body 40 connects the movable body 14 with the fixed body 16 in a state that movement (turning) in the rolling direction "R" of the movable body 14 is permitted between the movable body 14 and the fixed body. In this embodiment, the plate spring 52 is provided with one end part 52a, the other end part 52b and a freely bendable part 52c.

More specifically, the plate spring 52 is structured to be an "U"-shaped member as a whole, and its one end part 52a and the other end part 52b are disposed on the "−Z" direction side in the optical axis direction ("Z" direction). The freely bendable part 52c is extended to the "+Z" direction from the one end part 52a and folded back in a "U"-shape and connected with the other end part 52b. In this embodiment, it is structured that the one end part 52a and the other end part 52b are relatively displaced from each other on the circumference "C" and thereby, an elastic force is generated in the freely bendable part 52c, in other words, in the elastic member 52.

In this case, a shape of the freely bendable part 52c of the plate spring 52 may be changed into other shapes such as a "V"-shape, "I"-shape or "N"-shape other than the "U"-shape as shown in the embodiment in the drawing. In a case of an "I"-shape and an "N"-shape, the positions of the one end part 52a and the other end part 52b are located on an opposite side to each other in a direction along the optical axis.

In this embodiment, the one end part 52a of the plate spring 52 is fixed to a lower end part of the side plate part 40c of the intermediate frame body 40. On the other hand, the other end part 52b of the plate spring 52 is fixed to the holder frame 38 which holds the optical module 12 and is integrally moved with the optical module 12. In this case, fixing of the plate spring 52 to the intermediate frame body 40 and the holder frame 38 is performed by adhesion, fitting, engagement or the like therebetween. In this embodiment, the one end part 52a and the other end part 52b of the plate spring 52 are, as an example, formed in a rectangular plate shape. However, they may be formed in other various shapes such as a circular plate shape, a spherical body shape, a bar shape other than the rectangular plate shape.

In this embodiment, the plate spring 52 is disposed at least three positions where the circumference "C" (FIG. 4) having a predetermined radius with the optical axis "L" as a center is equally divided. In this embodiment, as shown in FIG. 4, as an example, four metal plate springs 52 are disposed at four positions which are determined by dividing the circumference "C" by 90° into four segments with the optical axis "L" as a center. In this case, the phrase "equally divided" does not mean strictly and equally divided and may be allowed to be substantially equally divided.

In this embodiment, the plate spring 52 is disposed so that, in a state that the plate spring 52 is assembled between the intermediate frame body 40 and the holder frame 38, a direction of the plate thickness is directed in a turning direction around the optical axis "L" of the movable body 14, in other words, in the rolling direction "R". In this embodiment, in the expression that "a direction of the plate thickness is directed in a turning direction around the optical axis "L" of the optical module 12, in other words, in the rolling direction "R"", the phrase "directed in the rolling direction "R"" does not mean in this specification that a direction of the plate thickness is strictly and precisely directed in the rolling direction "R", which is always changing. Specifically, the direction may vary in a range that a function for turnably supporting the optical module 12 around the optical axis "L" does not become unstable, and the direction of the plate thickness may be inclined to some extent with respect to the rolling direction "R" within an allowable range.

Regarding Shake Correction of Optical Unit

Next, correction of pitching and yawing and correction of rolling in the optical unit 10 will be described below.

Pitching and Yawing Correction

When a shake occurs in both directions or in either direction of the pitching direction "Y" and the yawing direction "X" in the optical unit 10, the shake is detected with by a shake detection sensor (gyroscope) not shown. The shake correction drive mechanism 24 is operated so as to correct the shake based on a detected result of the shake detection sensor. Specifically, an electric current is supplied to the coils 32A and 32B to drive the shake correction drive mechanism 24 so as to move the movable body 14 in a direction canceling the shake of the optical unit 10. Alternatively, it may be structured that a shake of the optical unit 10 is detected based on variations of the magnetic flux densities of the respective pairs of the magnetic sensors (Hall element) 34A and 34B and the magnets 42A and 42B for detection and correction of pitching and yawing to drive the shake correction drive mechanism 24.

Rolling Correction

When a shake occurs in the optical unit 10 in the rolling direction "R", the shake in the rolling direction "R" of the optical unit 10 is detected based on variation of the magnetic flux density of the pair of the magnetic sensor (Hall element) 34C and the magnet 42 C for detection and correction of rolling. The rolling drive mechanism 46 is operated so as to correct the shake based on a detected result for the shake. In other words, an electric current is supplied to the coil 32C so as to the move movable body 14 in a direction canceling the shake of the optical unit 10 and the rolling drive mechanism 46 is driven to correct the shake in the rolling direction "R".

A drive source for performing a correcting operation of a shake is not limited to a voice coil motor which is structured of the respective pairs of the coils 32A, 32B and 32C and the magnets 42A, 42B and 42C like the shake correction drive mechanism 24 and the rolling drive mechanism 46. A stepping motor, a piezo element or the like may be utilized as other drive sources.

After the shake corrections in the pitching direction "Y", the yawing direction "X" and the rolling direction "R" have been performed, when electric power to the drive source is stopped, the optical unit 10 is returned to the states at the initial positions where the shake corrections are respectively released by a posture return mechanism using magnetic springs and spring properties of the elastic members (plate spring) 52.

In this embodiment, although not shown, the posture return mechanism is a structure which utilizes a magnetic attraction force generated between a magnetic body and a magnet separately provided on the fixed body 16 side and the movable body 14 side. The magnetic body and the magnet are disposed so that, when located at the initial position in a posture without a shake, the magnetic attraction force acts so as to hold a posture at the initial position and, when displaced from the initial position due to a shake, the magnetic attraction force acts in a direction so that the posture is returned to the original initial position.

Regarding Optical Module and Heat Radiation Member

Figure 5:
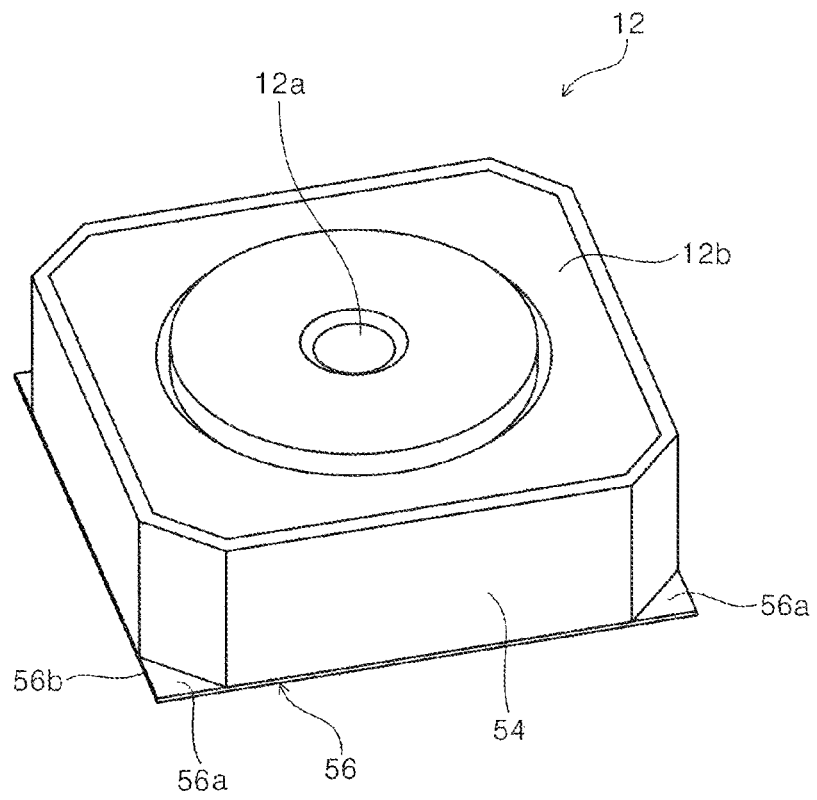
FIG. 5 is a perspective view showing a first embodiment of an optical module and a heat radiation member in accordance with the present invention.
Figure 5:
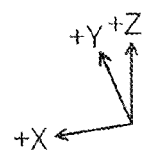
Figure 6:
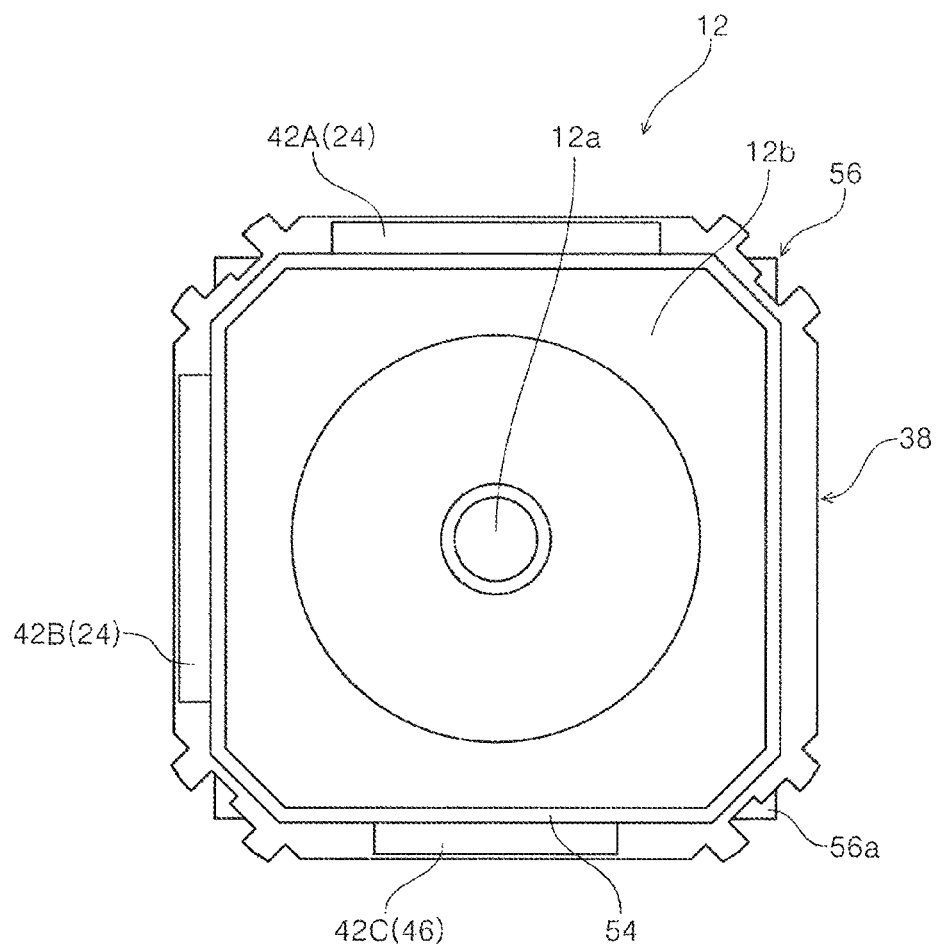
FIG. 6 is a plan view showing a first embodiment of an optical module and a heat radiation member in accordance with the present invention.

The optical module 12 and a heat radiation member 54 in accordance with an embodiment of the present invention will be described below with reference to FIG. 5 through FIG. 8. In FIG. 5 and FIG. 6, the optical module 12 includes the lens 12a on the object side ("+Z" direction side) of the housing 12b in a rectangular shape. In this embodiment, a circuit board 56 is attached to the housing 12b on an opposite side ("−Z" direction side) to an object side.

The circuit board 56 is, as an example, electrically connected with an imaging element and the like in an inside of the optical module 12. In this embodiment, the circuit board 56 is, as an example, formed in a rectangular shape. At least a part of the circuit board 56 is protruded with respect to the housing 12b having a rectangular shape in directions ("X"-axis direction and "Y"-axis direction) intersecting the optical axis of the optical module 12.

In this embodiment, a portion of the circuit board 56, in other words, a protruded part 56a which is protruded from the housing 12b is arranged with a heat radiation member 54. In this embodiment, the heat radiation member 54 is, as an example, structured to be a frame-shaped member which surrounds the rectangular-shaped housing 12b around the optical axis. The heat radiation member 54 which is a frame-shaped member is attached to an object side ("+Z" direction side) of the protruded part 56a of the circuit board 56 which is protruded with respect to the housing 12b.

In this embodiment, the heat radiation member 54 is formed of metal material as an example. Specifically, it is preferable that the heat radiation member 54 is formed of material having high thermal conductivity such as iron or aluminum. Especially, as described below, in a case that the heat radiation member 54 is provided with a function as a back yoke, it is desirable that the heat radiation member 54 is structured of magnetic material (iron-based material or the like).

As shown in FIG. 6, the heat radiation member 54 is disposed between the housing 12b and the holder frame 38 which surrounds the housing 12b. In FIG. 6, three sides of the holder frame 38 are respectively attached with the magnets 42A, 42B and 42C. In this embodiment, the heat radiation member 54 is disposed between the holder frame 38 and the housing 12b in the directions intersecting the optical axis ("X"-axis direction and "Y"-axis direction), more specifically, between the magnets 42A, 42B and 42C and the housing 12b.

Figure 7:
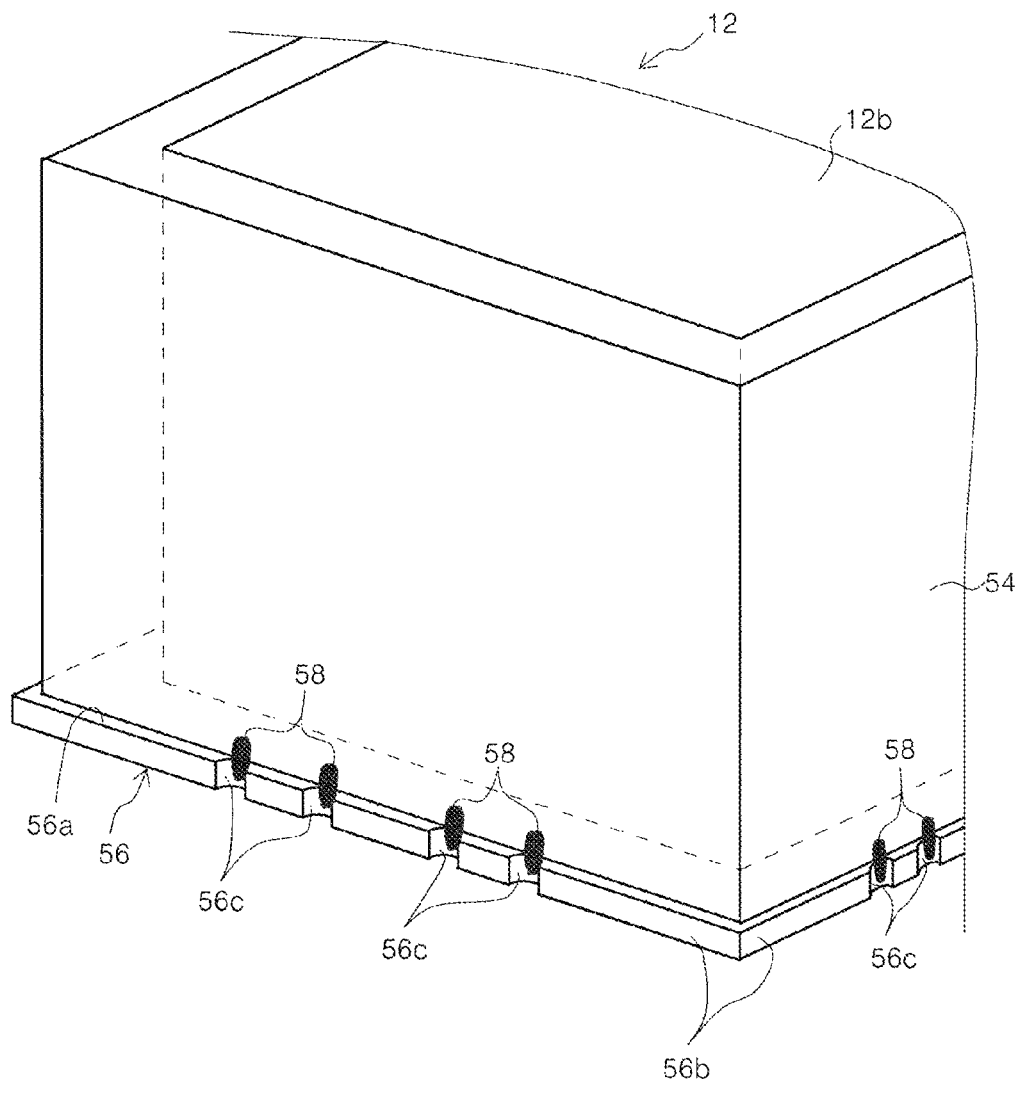
FIG. 7 is a schematic view showing a connecting state of a circuit board of an optical module with a heat radiation member.

A connecting state of the heat radiation member 54 with the circuit board 56 will be described below with reference to FIG. 7. The heat radiation member 54 is disposed on an upper face of the protruded part 56a of the circuit board 56. In this embodiment, a plurality of recessed parts 56c is provided in an outer circumferential edge part 56b of the circuit board 56. In this embodiment, the recessed part 56c is structured so that a part of a through hole for wiring of a circuit in the circuit board 56 is cut out and the remaining through hole portion is exposed to an outer side. In this embodiment, metal foil is stuck or metal film is formed by vapor deposition or the like in an inside of the recessed part 56c.

In this embodiment, the heat radiation member 54 is soldered to the circuit board 56. Specifically, as shown in FIG. 7, the recessed part 56c of the circuit board 56 and the heat radiation member 54 are connected with each other by solder 58. Therefore, heat generated in the circuit board 56 and thereby, heat in the optical module 12 is conducted from the recessed part 56c to the heat radiation member 54 through the solder 58. As a result, heat generation in the optical module 12 is radiated through the heat radiation member 54. In this manner, the optical module 12 can be maintained in an appropriate temperature condition and thereby, deformation or the like of the optical module 12 due to heat generation can be restrained and performance of the optical module 12 can be maintained.

In addition, the heat radiation member 54 is formed of metal material and the heat radiation member 54 and the circuit board 56 are soldered to each other. Therefore, heat conductivity from the circuit board 56 to the heat radiation member 54 can be improved and heat generated in the optical module 12 can be efficiently radiated. In addition, in this embodiment, the heat radiation member 54 is structured to be a frame-shaped body and thus, a surface area of the heat radiation member 54 can be increased and heat radiation property can be enhanced.

In addition, in this embodiment, the heat radiation member 54 is contacted with an upper face of the circuit board 56 as shown in FIG. 5. Therefore, the heat radiation member 54 is capable of radiating heat of the circuit board 56 through the contacted portion of the heat radiation member 54 with the circuit board 56.

Figure 8:
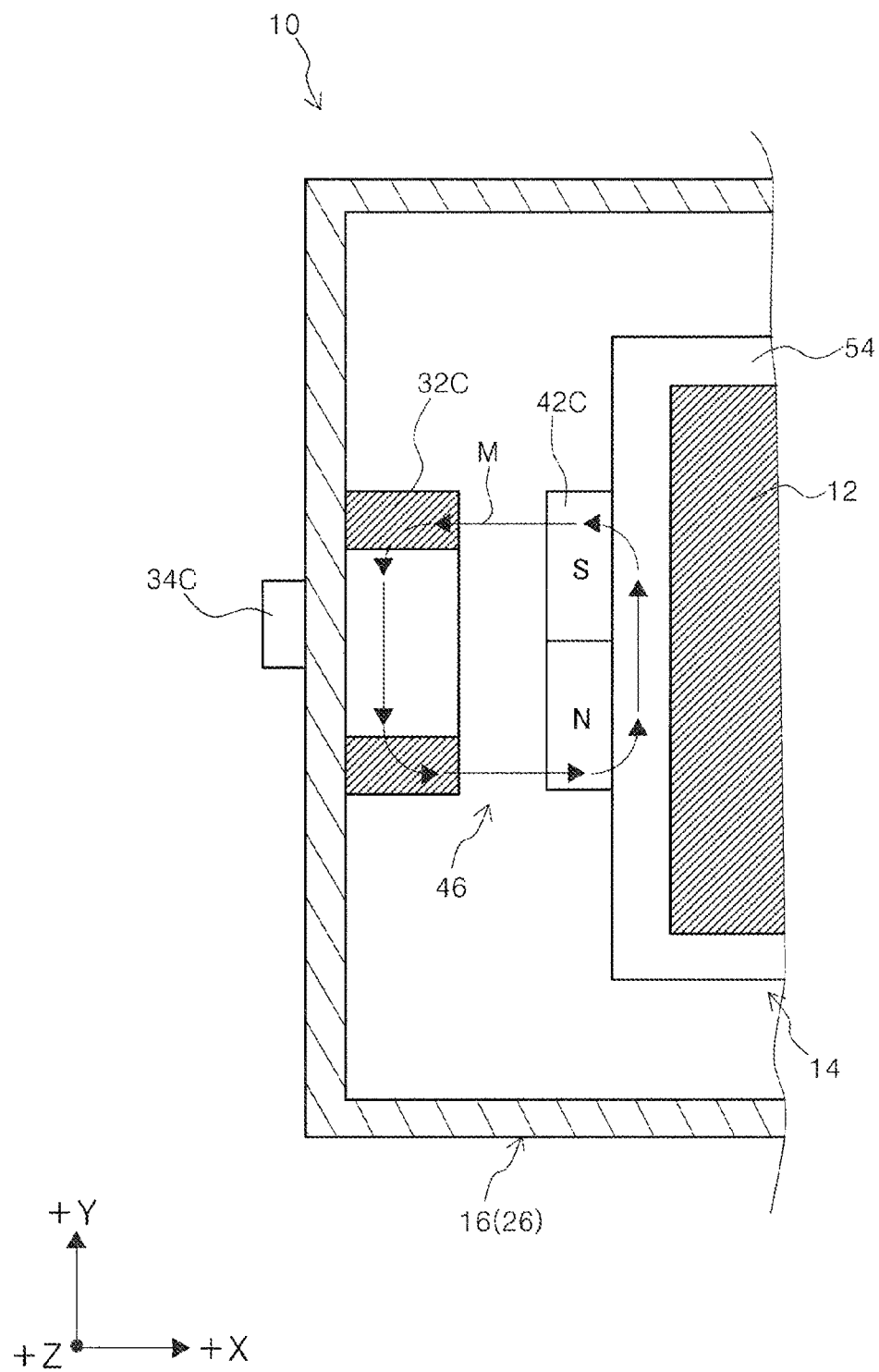
FIG. 8 is a cross-sectional side view showing a relationship between a heat radiation member and a shake correction drive mechanism.

In FIG. 8, an example is described in which the heat radiation member 54 is provided with a function as a back yoke. Some optical modules 12 are provided with a function of autofocus or the like for imaging through the lens 12a. Such optical modules 12 are, as an example, provided with a magnetic circuit (not shown) for performing the function. In the optical module 12 provided with the magnetic circuit, when the housing 12b is formed of material made of nonmagnetic substance, a magnetic force of the magnetic circuit may interfere with the shake correction drive mechanism 24 and the rolling drive mechanism 46 in the optical unit 10. In the following descriptions, the rolling drive mechanism 46 shown in FIG. 8 will be described below as an example.

Specifically, it may be occurred that a magnetic force of the magnetic circuit interferes with the shake correction drive mechanism 24 and the rolling drive mechanism 46, which are structured by respectively pairing the coils 32A, 32B and 32C with the magnets 42A, 42B and 42C, to cause variation of magnetic flux densities in the shake correction drive mechanism 24 and the roll drive mechanism 46. As a result, erroneous detection may be occurred in the magnetic sensors 34A, 34B and 34C which detect magnetic flux change of the shake correction drive mechanism 24 and the rolling drive mechanism 46 to cause an error to generate in a correction amount of the movable body 14 with respect to the fixed body 16. Therefore, a shake correction of the movable body 14 with respect to the fixed body 16 is not correctly performed and thus, optical performance in the optical module 12 is deteriorated.

As shown in FIG. 8, in this embodiment, the heat radiation member 54 formed of a magnetic body is disposed around the housing 12b made of a nonmagnetic body. Specifically, in the direction intersecting the optical axis ("X"-axis direction), the heat radiation member 54 which is a magnetic body is disposed between the magnet 42C of the rolling drive mechanism 46 and the housing 12b. When the heat radiation member 54 which is a magnetic body is disposed as described above, a magnetic force of the magnetic circuit in the inside of the housing 12b is blocked by the heat radiation member 54 which is a magnetic body and thus, influence on the magnetic flux density between the magnet 42C and the coil 32C in the rolling drive mechanism 46 can be reduced.

In addition, the magnet 42C is disposed on an outer side of the heat radiation member 54 and thus, a magnetic force of the magnet 42C can be passed through the heat radiation member 54 and thus, magnetic resistance can be reduced and magnetic efficiency in the rolling drive mechanism 46 can be enhanced. As a result, consumption of electric power for driving the rolling drive mechanism 46 can be reduced. In FIG. 8, the arrows added with the reference sign "M" circulating between the magnet 42C and the coil 32C schematically show a magnetic circuit in the rolling drive mechanism 46.

In this embodiment, the heat radiation member 54 is a magnetic body and thus, in addition to a heat radiation function, a shielding function which blocks a magnetic force leaking from the optical module 12 and a back-yoke function which enhances magnetic efficiency of the rolling drive mechanism 46 can be provided.

Regarding Modified Embodiments (1) In the embodiment described above, as shown in FIG. 5, it is structured that all of the heat radiation member 54 is disposed within an occupation area of the protruded part 56a of the circuit board 56 in the directions intersecting the optical axis direction ("X"-axis direction and "Y"-axis direction). However, instead of this structure, for example, as shown in FIG. 9, it may be structured that a part of the heat radiation member 54 and the protruded part 56a are overlapped with each other.

Figure 9:
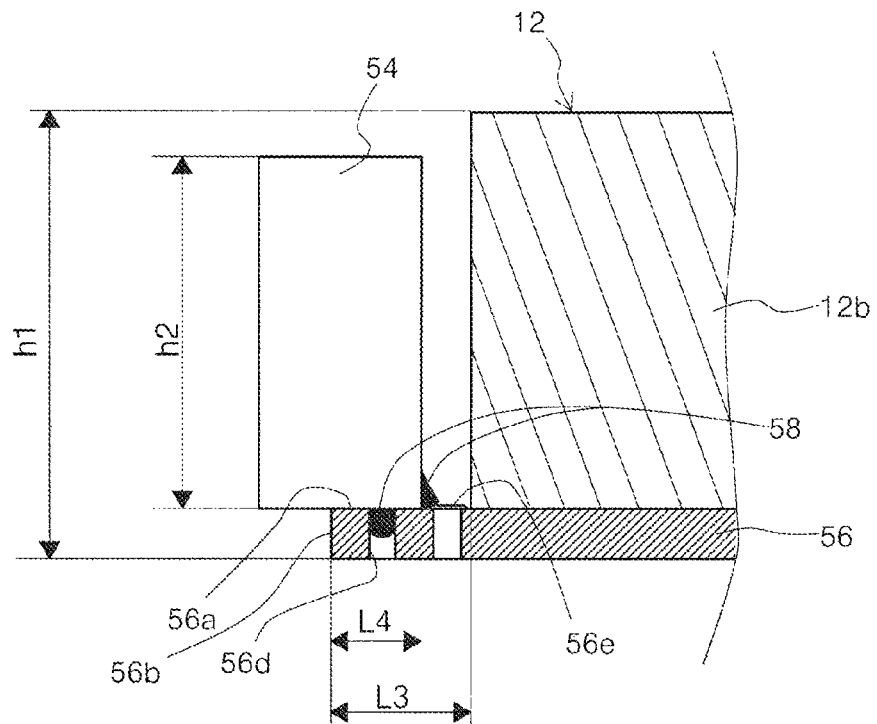
FIG. 9 is a cross-sectional side view showing a modified embodiment of a connecting state of a circuit board of an optical module with a heat radiation member.

Specifically, in FIG. 9, in a case that a length of the protruded part 56a of the circuit board 56 which is protruded from the housing 12b of the optical module 12 in the direction intersecting the optical axis direction is the "L3", the heat radiation member 54 is overlapped with the circuit board 56 by the length "L4" in the direction intersecting the optical axis. Also, in this structure, at least a part of the heat radiation member 54 is overlapped with the circuit board 56 in the direction intersecting the optical axis and thus, a size of the device in the direction intersecting the optical axis of the optical module 12, i.e., the optical unit 10 can be reduced.

(2) In the embodiment described above, as shown in FIG. 5, the heat radiation member 54 is structured so as to have the same height in the optical axis direction as the housing 12b. However, the present invention is not limited to this structure and, as shown in FIG. 9, a height of the heat radiation member 54 may be set in "h2" which is lower than the height "h1" of the housing 12b in the optical axis direction. In other words, when it is structured that a height of the heat radiation member 54 is the same as that of the housing 12b in the optical axis direction or lower than that of the housing 12b, a size of the optical module 12 in the optical axis direction and thereby, a size of the device in the optical axis direction of the optical unit 10 can be reduced.

(3) In the embodiment described above, it is structured that the recessed parts 56c provided in the outer circumferential edge part 56b of the circuit board 56 and the heat radiation member 54 are soldered with each other. However, instead of the structure, for example, it may be structured that through holes 56d of the circuit board 56 located on a lower side of the heat radiation member 54 and a lower end of the heat radiation member 54 are soldered with each other by using solder 58. Further, it may be structured that a land part 56e formed on an upper face of the circuit board 56 and the heat radiation member 54 are soldered with each other by using solder 58. Further, when the heat radiation member 54 and the circuit board 56 are structured so that heat conduction from the circuit board 56 to the heat radiation member 54 can be performed, they may be connected with each other by fastening using a metal screw or a metal bolt, adhesion, welding, or the like.

(4) In the embodiment described above, it is structured that the shake correction drive mechanism 24 is provided between the movable body 14 and the fixed body 16. However, it may be structured that the shake correction drive mechanism 24 is provided in an inside of the housing 12b of the optical module 12.

The above-mentioned modified embodiments described in (1) through (4) may be similarly applied to a second embodiment described below.

Second Embodiment

An optical module 60 in accordance with a second embodiment differs from the first embodiment in a point that an arrangement state of the heat radiation member 62 is different. Other structures in the optical unit 10 are provided with similar structures to the first embodiment.

Figure 10:
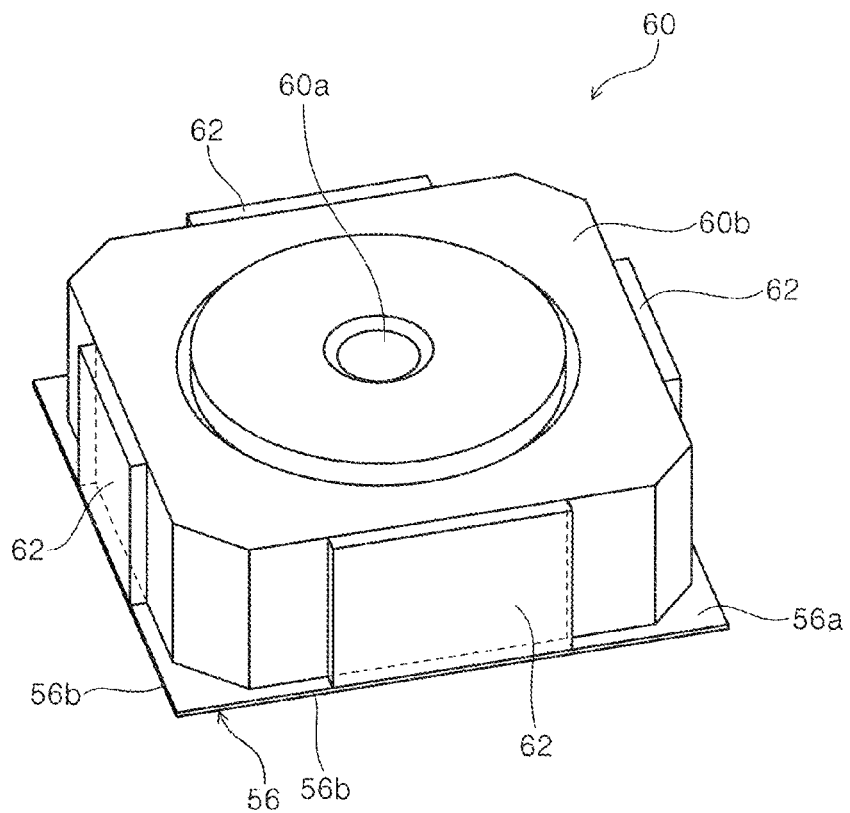
FIG. 10 is a perspective view showing a second embodiment of an optical module and a heat radiation member in accordance with the present invention.
Figure 11:
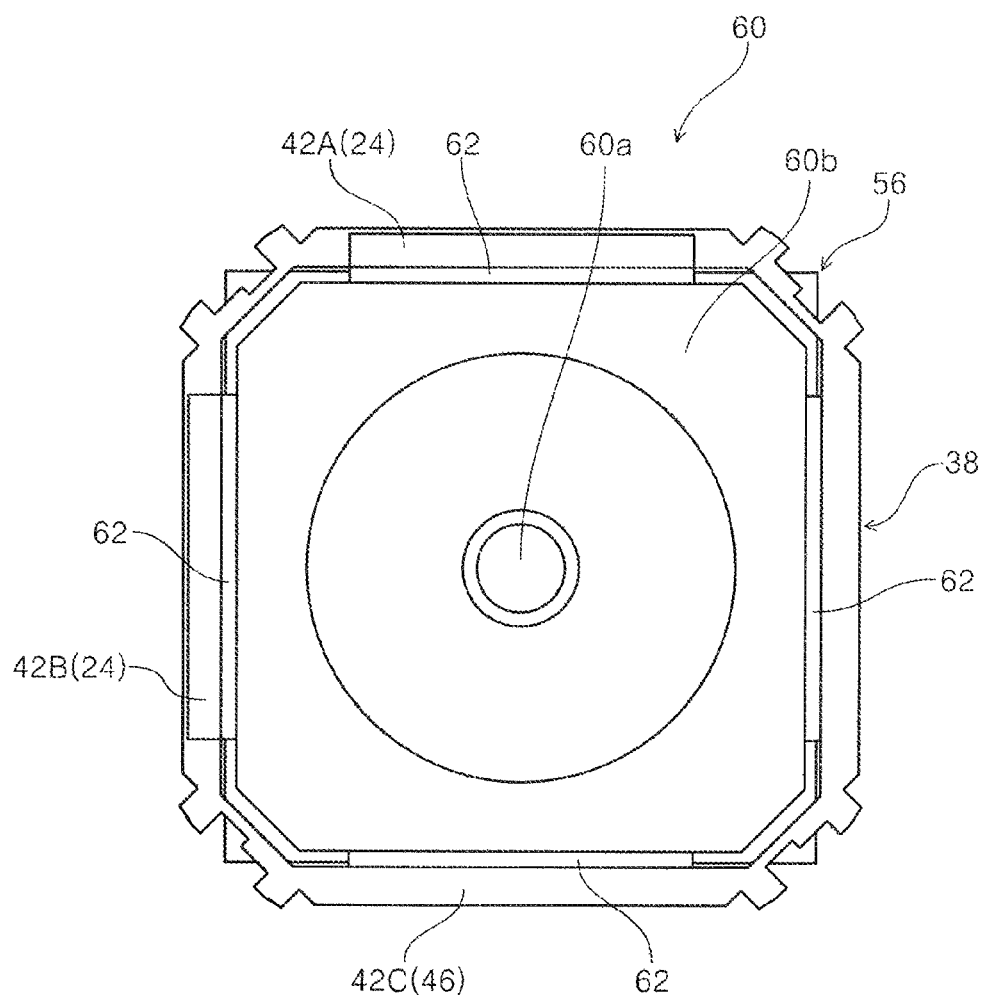
FIG. 11 is a plan view showing a second embodiment of an optical module and a heat radiation member in accordance with the present invention.

As shown in FIG. 10 and FIG. 11, the optical module 60 includes a lens 60a and a rectangular case-shaped housing 60b. A circuit board 56 is attached to the housing 60b on an opposite side ("−Z" direction side) to an object side. The circuit board 56 is formed with a protruded part 56a which is protruded from the housing 60b in directions intersecting the optical axis ("X"-axis direction and "Y"-axis direction).

In this embodiment, a plurality of heat radiation members 62 is disposed around the housing 60b of the optical module 60 at appropriate intervals. Specifically, a plurality of the heat radiation members 62 is disposed between the holder frame 38 surrounding a periphery of the housing 60b and the housing 60b (FIG. 11). In this embodiment, the heat radiation member 62 is disposed at four positions so as to respectively correspond to four sides of the housing 60b in a rectangular shape. Three of the four heat radiation members 62 are disposed at positions facing the magnets 42A, 42B and 42C which are attached to the holder frame 38.

Therefore, also in this embodiment, in a case that the housing 60b is formed of a nonmagnetic body, when the heat radiation member 62 is structured of a magnetic body, influence of a magnetic circuit in an inside of the optical module 60 on the shake correction drive mechanism 24 and the rolling drive mechanism 46 can be reduced, and magnetic efficiency of the shake correction drive mechanism 24 and the rolling drive mechanism 46 are enhanced and consumption of electric power can be reduced. In addition, the heat radiation member 62 is disposed only in a required portion in an entire periphery of the housing 60b and thus, the heat radiation member 62 is not required to dispose over an entire periphery of the housing 60b and a weight of the optical module 60 can be reduced.

Modified Embodiments (1) In this embodiment, it is structured that the heat radiation member 62 is disposed so as to correspond to four sides of the housing 60b. However, the heat radiation member 62 may be disposed so as to correspond to only three sides of the holder frame 38 where the magnets 42A, 42B and 42C are provided. Alternatively, in this embodiment, it is structured that the heat radiation member 62 is disposed one on each of four sides of the housing 60b, but it may be structured that a plurality of the heat radiation members 62 is disposed on each side.

(2) In this embodiment, it is structured that the heat radiation member 62 is disposed so as to correspond to four sides of the housing 60b. However, in addition to this structure, it may be structured that parts in the "Z"-axis direction of the respective heat radiation members 62, for example, end parts on the "+Z" direction side or end parts on the "−Z" direction side are mutually connected with adjacent heat radiation members 62 so that the heat radiation member 62 is formed in a frame-shaped member.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An optical unit comprising:
  a movable body comprising an optical module; and
  a fixed body which holds the movable body in a displaceable state;
  wherein the movable body comprises:
    a circuit board, provided in the optical module; and
    at least one heat radiation member formed of metal material, disposed in a periphery of the optical module;
  wherein the circuit board is disposed on an opposite side of the optical module to an object side, and the circuit board is provided with a protruded part which is protruded with respect to the optical module in a direction intersecting an optical axis of the optical module;
  the heat radiation member is directly placed on and contacted with the protruded part of the circuit board, so that the heat radiation member is capable of radiating heat of the circuit board through a contacted portion of the heat radiation member with the circuit board;
  an outer circumferential edge part of the circuit board is provided with a plurality of recessed parts which are recessed toward the heat radiation member from an outer circumferential edge of the protruded part to an inner side of the protruded part;
  a metal foil formed on the recessed part and the heat radiation member formed of metal material are connected with each other by a solder, and thereby, heat generated in the circuit board is conducted from the recessed part to the heat radiation member through the solder, and the heat radiation member and the circuit board are fixed to each other by the solder.

2. The optical unit according to claim 1, further comprising:
  a shake correction drive mechanism, structured to drive the movable body around a first axial line intersecting an optical axis direction of the optical module and around a second axial line intersecting the optical axis direction and the first axial line,
  wherein the shake correction drive mechanism comprises a magnet provided on a side of the movable body and a coil provided on a side of the fixed body,
  wherein the heat radiation member is structured of a magnetic body, and
  wherein the heat radiation member is disposed between the optical module and the magnet in a direction intersecting the optical axis direction.

3. The optical unit according to claim 2, wherein
the heat radiation member is disposed around an optical axis of the optical module at intervals and faces the magnet.

4. The optical unit according to claim 1, wherein
the heat radiation member is structured of a frame-shaped member which surrounds the optical module around an optical axis of the optical module.

5. The optical unit according to claim 1, wherein
at least a part of the heat radiation member is overlapped with the optical module in an optical axis direction of the optical module.

* * * * *